(12) United States Patent
Wilson, Jr.

(10) Patent No.: US 7,396,034 B2
(45) Date of Patent: Jul. 8, 2008

(54) JACK WITH AN OPTIONAL PIVOTING FOOT

(76) Inventor: Jimmy A. Wilson, Jr., 10 Shaelah Dr., St. Charles, MO (US) 63304

( * ) Notice: Subject to any disclaimer, the term of this patent is extended or adjusted under 35 U.S.C. 154(b) by 367 days.

(21) Appl. No.: 11/210,911

(22) Filed: Aug. 24, 2005

(65) Prior Publication Data

US 2006/0043695 A1     Mar. 2, 2006

Related U.S. Application Data

(60) Provisional application No. 60/605,412, filed on Aug. 30, 2004.

(51) Int. Cl.
*B60D 1/66*      (2006.01)
(52) U.S. Cl. .................. 280/475; 280/763.1; 280/767
(58) Field of Classification Search ................ 280/475, 280/763.1, 767
See application file for complete search history.

(56) References Cited

U.S. PATENT DOCUMENTS

| | | | | |
|---|---|---|---|---|
| 2,033,207 A | * | 3/1936 | Schultz, Jr. ................ | 16/32 |
| 2,126,811 A | * | 8/1938 | Rambo et al. ............... | 16/34 |
| 3,314,692 A | * | 4/1967 | Karns ......................... | 280/475 |
| 3,807,767 A | * | 4/1974 | Moline ........................ | 280/477 |
| 3,944,259 A | * | 3/1976 | Miller ......................... | 280/475 |
| 5,282,605 A | * | 2/1994 | Sauber ........................ | 254/420 |
| 6,302,381 B1 | * | 10/2001 | Roll ............................. | 254/425 |
| 6,659,696 B2 | * | 12/2003 | Hoffnung ..................... | 410/66 |

* cited by examiner

*Primary Examiner*—Lesley D. Morris
*Assistant Examiner*—Michael Stabley
(74) *Attorney, Agent, or Firm*—Charles McCloskey

(57) ABSTRACT

A jack with an optionally pivoting foot provides a trailer owner the ability to change between a wheel and a flat foot or a flat foot and a wheel upon a jack depending from a trailer tongue. The present invention has an optional foot attached to a jack that rotates from a horizontal position to underneath an existing foot. The foot has two parallel spaced apart flanges extending upwards from a base. The flanges have a bolt through a centered hole near the wheel about which the pivoting foot rotates. Opposite the base, the flanges have three holes about the perimeter through which a handle inserts. The handle secures the foot in either horizontal or vertical configurations. When in a vertical configuration, a wheeled jack does not move upon nor embed into the ground. A jack with a flat foot prevents a trailer from moving.

7 Claims, 5 Drawing Sheets

JACK WITH AN OPTIONAL PIVOTING FOOT

CROSS-REFERENCE TO RELATED APPLICATIONS

This utility patent application claims the benefit and priority of provisional application Ser. No. 60/605,412, filed Aug. 30, 2004 and commonly owned by the same inventor. The above noted application is incorporated herein by reference.

BACKGROUND OF THE INVENTION

The jack with an optional pivoting foot relates to towed trailers in general and more specifically to the jack beneath the tongue of a trailer. A unique aspect of the present invention is an optional pivoting foot connected to the jack that rotates beneath the existing foot of the jack to change the jack from wheeled to a flat foot and vice versa. The optional flat foot embodiment increases the footprint of a wheeled trailer jack, prevents rolling, and reduces embedment of the wheel in soft soils or warm asphalt. The optional wheeled foot embodiment allows movement of the jack upon a surface while supporting the tongue load.

People enjoy the water and activities upon and adjacent to water. Many activities involve watercraft to take people upon the water. In the absence of a mooring facility, dock, or the like, an owner transports a boat from storage to a water body. Generally, boaters transport boats upon trailers towed by vehicles. A trailer has a frame to support the boat hull, a chassis to support the frame, an axle beneath the chassis for wheels to contact a road, and a tongue at the head of the chassis to connect with a vehicle. The tongue has one member, or two members that intersect at a point, to serve as the hitch. To support the tongue during hitching and unhitching to a vehicle, trailers have a jack.

The jack sits rearward of the tongue upon one or more members. The jack descends from the members towards the ground. Geared cranks, hydraulic cylinders, levers, and the like extend the jack to raise the chassis of the trailer and retract the jack to lower the chassis. Opposite the members, a jack has a wheel or a flat foot.

Boats also enter storage in many locations and display at dealers. On flat surfaces, warehouses, and dealership showrooms, owners and dealers secure trailers with wheel chocks on the rear axle and the wheeled jack. Chocks become misplaced or forgotten by dealership staff which raises the likelihood of a trailer—equipped with only a wheeled jack—rolling or other mishap.

The present invention overcomes the limitations of the prior art. That is, the art of the present invention, a jack with an optional pivoting foot, provides a jack with an exchangeable wheeled foot and a flat foot. A trailer owner, boater, or worker may choose the appropriate foot for the situation at hand. The boater need not dwell upon whether he brought the correct jack. Trailer owners with a wheeled jack may overlook and misplace a chock from time to time. While trailer owners with a flat footed jack cannot readily move the trailer tongue without lifting. The present invention reduces the need for separate wheel chocks and provides trailer owners the choice of wheeled or flat foot as an option for their jacks beneath the trailer tongue.

The difficulty in providing a jack with an optional pivoting foot is shown by a typical jack. A jack has either a wheel or a flat foot in contact with the ground. The jack supports the tongue during hitching and prevents the tongue from digging into the ground. A wheeled jack permits movement of the tongue as the trailer moves. The flat foot fixes the jack location for a secure and non-movable trailer. At present, a jack has either a wheel or a flat foot to support the tongue but not both. A trailer owner using the present invention can choose either the wheeled or flat foot for the jack to provide the appropriate foot upon the jack given the situation, pavement, or location.

DESCRIPTION OF THE PRIOR ART

Jacks in many forms are known in the prior art. Early carts began with a prop rod beneath the tongue. The prop rod raised the tongue when a cart, or trailer, did not move. The prop rod kept the trailer level and prevented rolling. A level trailer is easier to unload and more safe to work around. In time, prop rods developed into jacks of many kinds. Jacks raise and lower the tongue in a controlled manner. Jacks allow a person to move a tongue under loads in excess of five hundred pounds. Controlled rising of the tongue provides safe detachment of a loaded trailer from its prime mover, vehicle, or truck. Controlled lowering of the tongue safely attaches a trailer to the ball or other hitch upon a vehicle or truck.

The prior art has many instances of jacks and similar devices. For instance, a jack foot, made by Northern Tool & Equipment Co., attaches beneath a jack. The jack foot has a rectangular shape with the longitudinal axis parallel to the length of the trailer. The jack foot bolts to a jack but does not permit ready exchange with a wheeled foot. The Northern Tool jack foot replaces a wheeled foot. The Trailer Parts Superstore® provides a jack foot pad. This pad has a cylindrical sleeve centered upon a plate with upturned edges. The sleeve fits over a jack, depending from the tongue. As with Northern Tool's jack foot, the Trailer Parts Superstore® pad replaces a wheeled foot with a flat pad. The prior art has flat attachments for jacks to replace wheeled feet upon trailers.

Then the patent to Hoffnung, U.S. Pat. No. 6,659,696, shows a caster securing mechanism. The '696 patent discloses a shoe that pivots upon the axle of a caster. The shoe has two supports spanned by a plate. The plate has holes to bolt the shoe to a pallet. In contrast, the present invention has two flanges spanned by a base and that pivot upon a bolt located well above a wheel axle. The present invention can be temporarily locked away from the wheel in contrast to the '696 patent.

The patent, to Miller, U.S. Pat. No. 3,944,259 is for a trailer jacking device which shows an adjustable wheel secured by a pin upon a frame at a trailer tongue. The adjustable wheel includes a detachable shoe that secures to the wheel by a pin inserted through the wheel. The present invention however has a plate that passes beneath a wheel, solid or spoked.

The patent to Rambo et al., U.S. Pat. No. 2,125,811 is for a caster, generally used in scaffolding. The '811 patent discloses a stirrup that rotates beneath a wheel. The stirrup attaches outside the supports for the axle of the wheel and has rounded ends that cooperate with a plate and an elongated hole. The present invention calls for one hole through a tube and a clamped on pivot bolt and your base pivots beneath the wheel.

Lastly, the patent to Schultz, U.S. Pat. No. 2,033,207 shows a caster wheel appliance, for a table. The '207 patent has a yoke that grasps the axle of a caster W and has a shape so a person can lock and unlock the caster W by placing his foot upon the yoke. However, the present invention attaches to the stem 7 and not the axle of the wheel.

Thus, prior art jack feet do not provide for ready exchange between a wheeled and a flat foot at the jack beneath the tongue of a trailer. The present invention mounts to a jack with the original wheel or flat foot remaining in place. The present invention allows an owner to select and readily change between a wheeled foot and a flat foot upon the jack of a trailer. The present invention has a base wider and longer than the wheel that reduces embedment into asphalt, miring in soil, and skidding upon pavement. The present invention clamps onto an existing stem and requires one hole, or two at the most, through the stem. And the present invention uses a base that moves completely away from the wheel, and flanges that lock in up and down positions.

SUMMARY OF THE INVENTION

The jack with an optional pivoting foot attaches to trailers of many kinds. The present invention can be original equipment or an after market item for trailers. Beginning beneath a jack, the present invention has a base with two flanges extending upward from the base. The flanges flank the wheel of a jack. Each flange has two or more holes opposite the base. The holes engage a bolt and a handle. Both the bolt and the handle pass through the jack, generally perpendicular to the length of a trailer. The bolt is located upon the centerline of the flanges and additional holes are arrayed in an arcuate path centered upon the bolt and opposite the base. The handle passes through aligned additional holes to secure the foot in one or more configurations. The foot locates beneath a wheel to transform the wheel into a flat foot. To allow a wheel beneath the jack, the foot rotates towards or away from the trailer. Alternatively, the base is replaced with a plate with a depending wheel. The alternate plate attaches to flanges as in the preferred embodiment. The alternate embodiment though transforms a flat foot jack into a wheeled jack as the foot rotates towards or away from the trailer.

By using the jack with a pivoting foot upon a jack for a trailer, a boater or trailer owner can change the jack from wheeled to flat foot. A wheeled jack allows the trailer to move while a flat foot prevents movement, increases safety, and thwarts embedment. A wheeled jack may sink into soft soils or warm asphalt while a flat foot maintains the jack upon the soil surface or pavement.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention. It is therefore an object of the present invention to provide a new and improved jack with an optional pivoting foot that has all of the advantages of the prior art and none of the disadvantages.

It is another object of the present invention to provide a jack with an optional pivoting foot that may be easily and efficiently manufactured and marketed.

It is still another object of the present invention to provide jack with an optional pivoting foot that may be readily attached to existing stems on trailers.

It is still another object of the present invention to provide a jack with an optional pivoting foot that may readily change from an up to a down position.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The same reference numerals refer to the same parts throughout the various figures.

DETAILED DESCRIPTION OF THE PREFERRED EMBODIMENT

Figure 1:
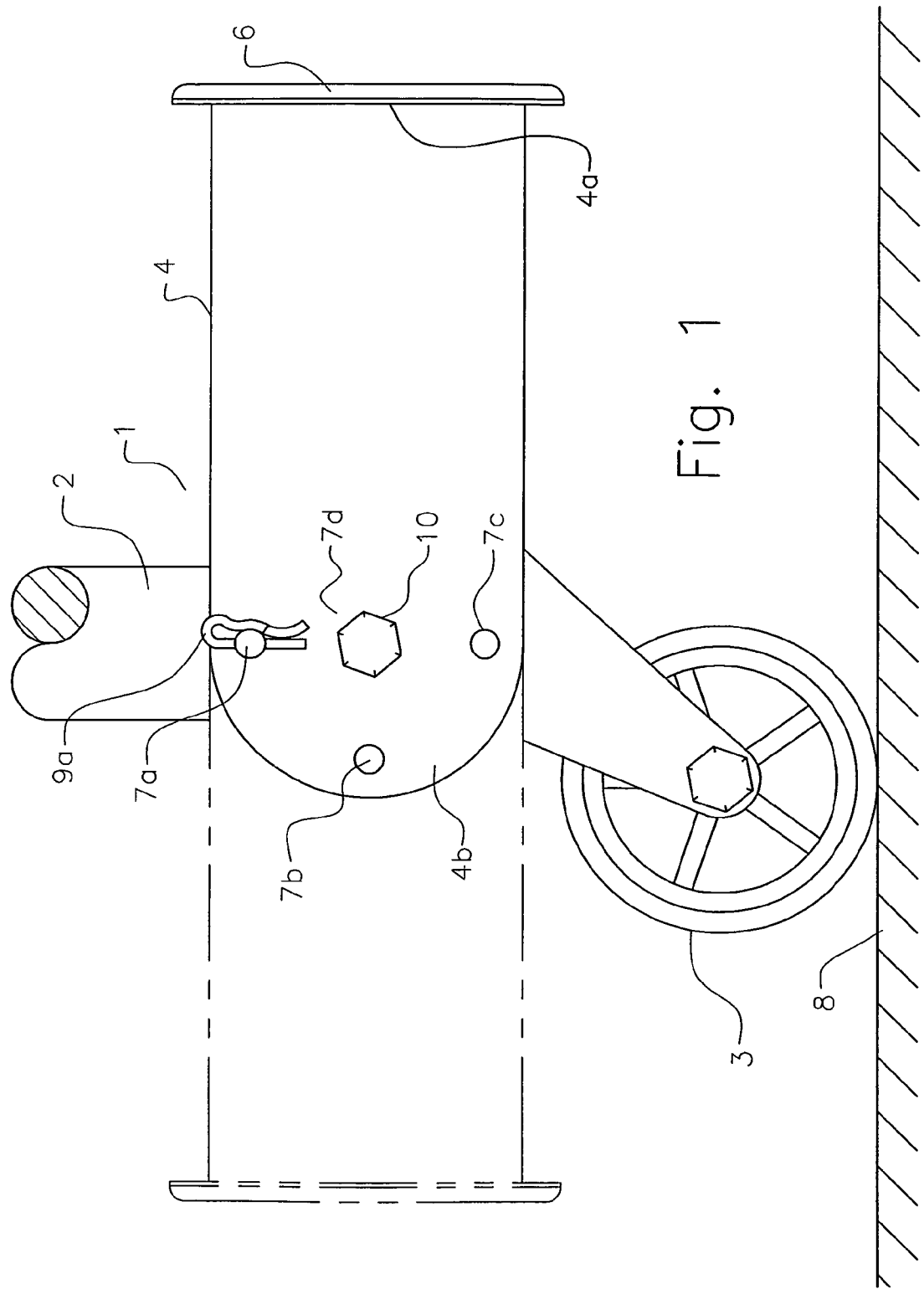
FIG. 1 shows a side view of the preferred embodiment of the present invention positioned towards a trailer with an alternate configuration shown in phantom away from a trailer.

The present invention overcomes the prior art limitations by providing a flat foot and a wheeled foot that interchange upon the same jack. Turning to FIG. 1, the jack with an optional pivoting foot 1 begins with a jack 2 descending from a trailer tongue. The jack 2 has a generally round cylindrical form, or rectangular, ending in two struts that support a wheel 3 mounted between them. Upon the jack 2 slightly above the wheel, a central hole 7d extends laterally through the center of the jack 2 and perpendicular to the wheel 3. Upwards from the central hole 7d, the jack 2 has a first hole 7a in line with the central hole 7d.

In combination with an existing jack 2, the present invention has a foot 1 with a left flange 4, an opposite right flange 5, and a base 6 joining both flanges. The base 6 has a generally rectangular shape with rounded corners and an upturned perimeter edge. The longitudinal axis of the base 6 is generally parallel to the wheel 3. The left flange 4 is mutually parallel to and spaced apart from the right flange 5. The left flange 4 and right flange 5 attach perpendicular to the base 6 and within the perimeter of the base 6. The left flange 4 and the right flange 5 have a square lateral end 4a, 5a that attaches to the base 6 and an opposite rounded end 4b, 5b proximate to the jack 2 as shown in FIG. 1.

The rounded end 4b, 5b has a generally semi-circular shape with a first hole 7a, a second hole 7b, and a third hole 7c proximate to the perimeter of the round end. The first hole 7a, second hole 7b, and the third hole 7c are spaced upon the perimeter so the present invention 1 attains up and down positions as desired. Preferably, the first hole 7a, second hole 7b, and the third hole 7c are located upon a radius from the center hole 7d and are spaced at an irregular interval from one another. In use, the foot 1 is rotated generally parallel with the ground 8 and a handle 9 is placed through the first holes 7a of the left flange 4, the right flange 5, and the jack 2. A pin secures the handle 9 through the first holes 7a resulting in the base 6 being located towards the rear of a trailer in a first configuration. FIG. 1 also illustrates that the base 6 can be located towards the front of a trailer, in a third configuration approximately 180° forward of the first configuration, with a handle 9 placed through the third holes 7c of the left flange 4 and the right flange 5, and the first hole of the jack 2.

Figure 2:
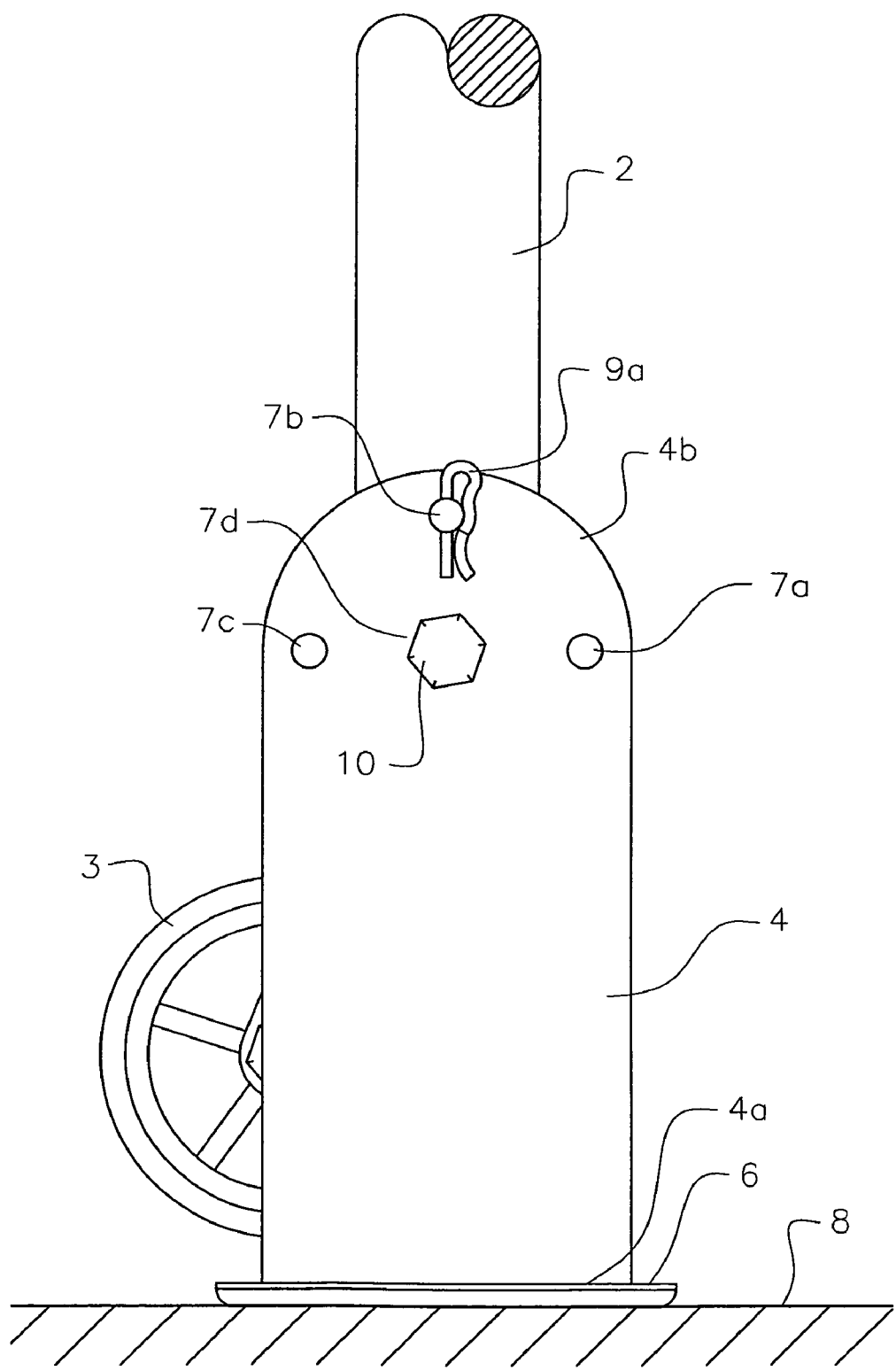
FIG. 2 shows another side view of the preferred embodiment of the present invention with the base positioned beneath the wheel of a jack.

After having a jack 2 with a wheel 3 in use, the present invention rotates the foot 1 to provide a flat foot upon a jack 2 shown in FIG. 2. Rotating the base 6 towards the ground 8 beneath the wheel 3, the second holes 7b of the left flange 4 and the right flange 5 approach the first hole 7a of the jack 2. Securing a handle 9 through the second holes 7b of the left flange 4 and the right flange 5 and the jack's first hole 7a, locates the base 6 beneath the wheel 3 in the second configuration. The second configuration is generally midway between the first and the third configurations. The height of the left flange 4 and the right flange 5 raises the wheel 3 above the base 6 so that the base 6 alone remains in contact with the ground 8. More particularly, the distance between the bolt 10 through the central hole 7d and the base 6 raises the wheel 3 above the base 6. With the flat foot upon the ground 8, the present invention prevents a trailer from moving and the jack 2 from sinking into the ground 8.

Figure 3:
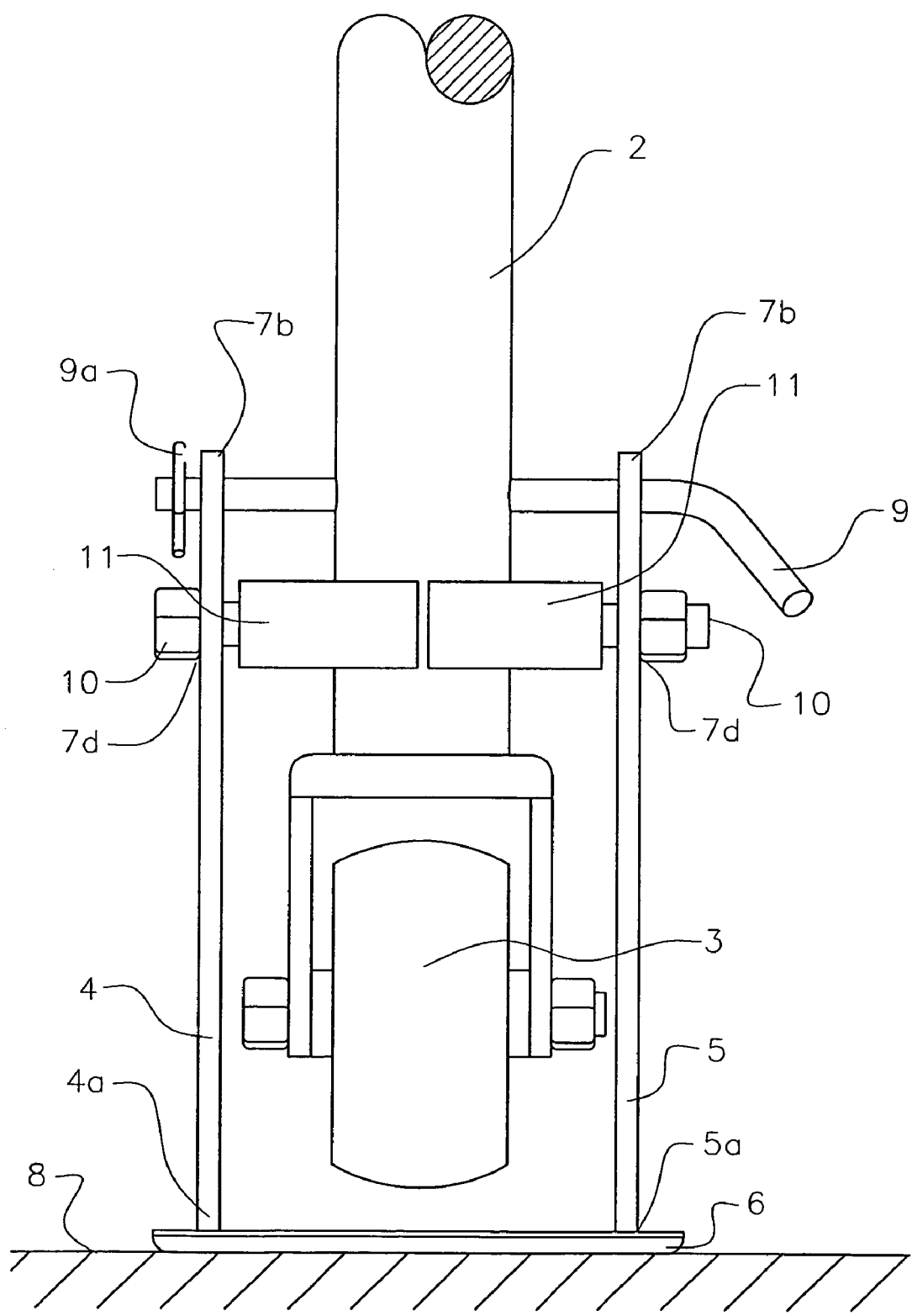
FIG. 3 describes an end view of the preferred embodiment akin to FIG. 2 rotated ninety degrees.

Then FIG. 3 shows a side view of the flat foot of the present invention. The left flange 4 and the right flange 5 are mutually parallel and spaced apart to flank the wheel 3. The left flange 4 and the right flange 5 extend perpendicular from the base 6. Opposite the base 6 and above the wheel 3, the present invention has at least one spacer 11. The spacer 11 has a central hole 7d that admits the bolt 10 about which the foot 1 pivots. In the flat foot position, the present invention has a handle 9 that extends through the second holes 7b of the left flange 4 and the right flange 5 as well as the first hole 7a of the jack 2. Upon its first end, or right, the handle 9 has a slight bend to assist in turning and pulling the handle 9 through the holes 7a, 7b, 7c. Opposite the first end, the handle 9 has a locking pin 9a upon the left. The locking pin 9a extends laterally through the handle 9 to prevent the handle 9 from inadvertently falling out of the holes 7a, 7b, 7c.

Figure 4:
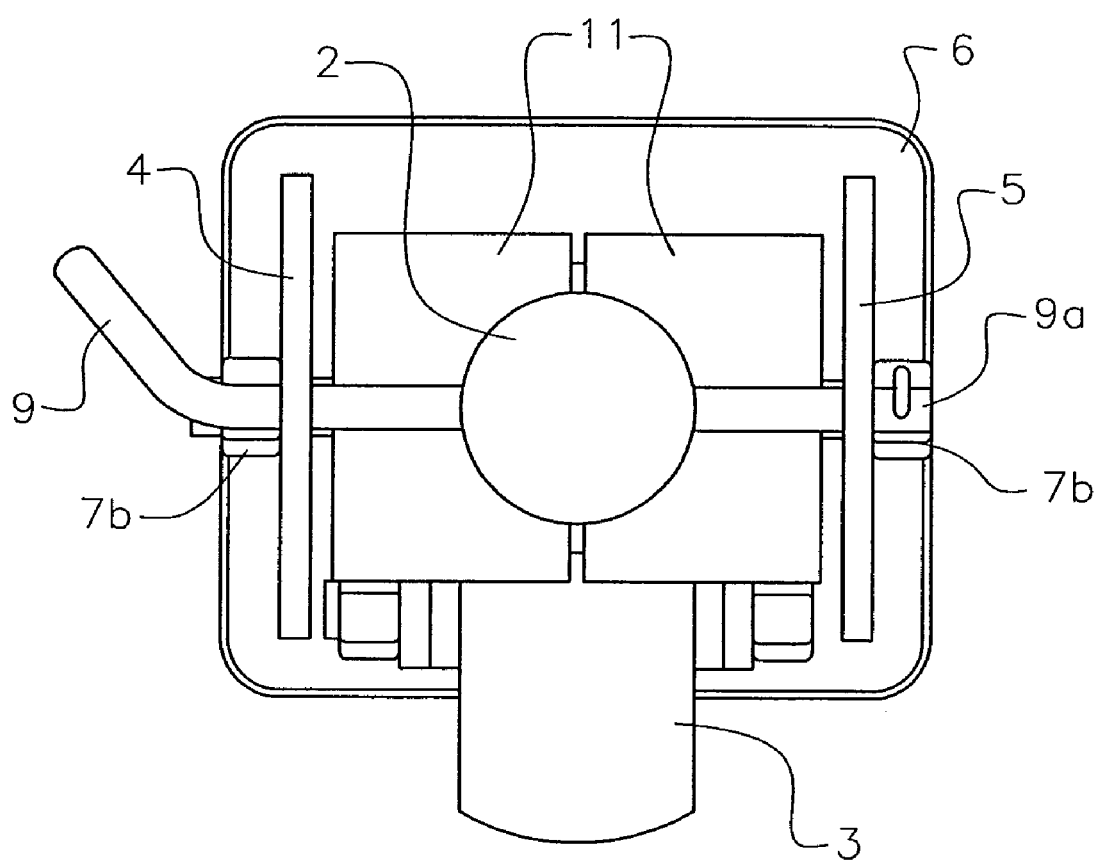
FIG. 4 has a top view of the present invention with the base beneath the wheel; and, FIG. 5 shows a side view of the alternate embodiment of the present invention.

Viewed beneath the trailer tongue in FIG. 4, the present invention has a flat foot, or second, configuration. In this configuration, the base 6 is beneath the wheel 3 with the longitudinal axis of the base 6 parallel to the diameter of the wheel 3. The wheel 3 is offset from the jack 2 and the center of the base 6, to permit turning of the wheel 3 in the direction of movement when the base 6 is rotated from under the wheel 3. Extending upwards from the base 6, the left flange 4 and the right flange 5 are generally centered upon the jack 2, parallel to the longitudinal axis of the jack 2, and flanking the wheel 3. Within the left flange 4 and the right flange 5, spacers 11 grasp the jack 2. The spacers have a shape that fits the outside of the jack 2. Then the bolt 10 extends through the spacer 11, though beneath the handle 9 in this view. The handle 9 extends away from the jack 2 and the base 6 upon the first end, or right, and outside of the right flange 5. On the second end, or left, the handle 9 has a locking pin 9a that makes the handle 9 snug to the left flange 4.

The present invention has a pivoting foot 1 connected to a jack 2 that allows a trailer owner to change from a wheeled to a flat jack without removing a component and without wheel chocks. The foot 1 attaches to the jack 2 and rotates among three configurations, secured by a lockable handle 9.

Figure 5:
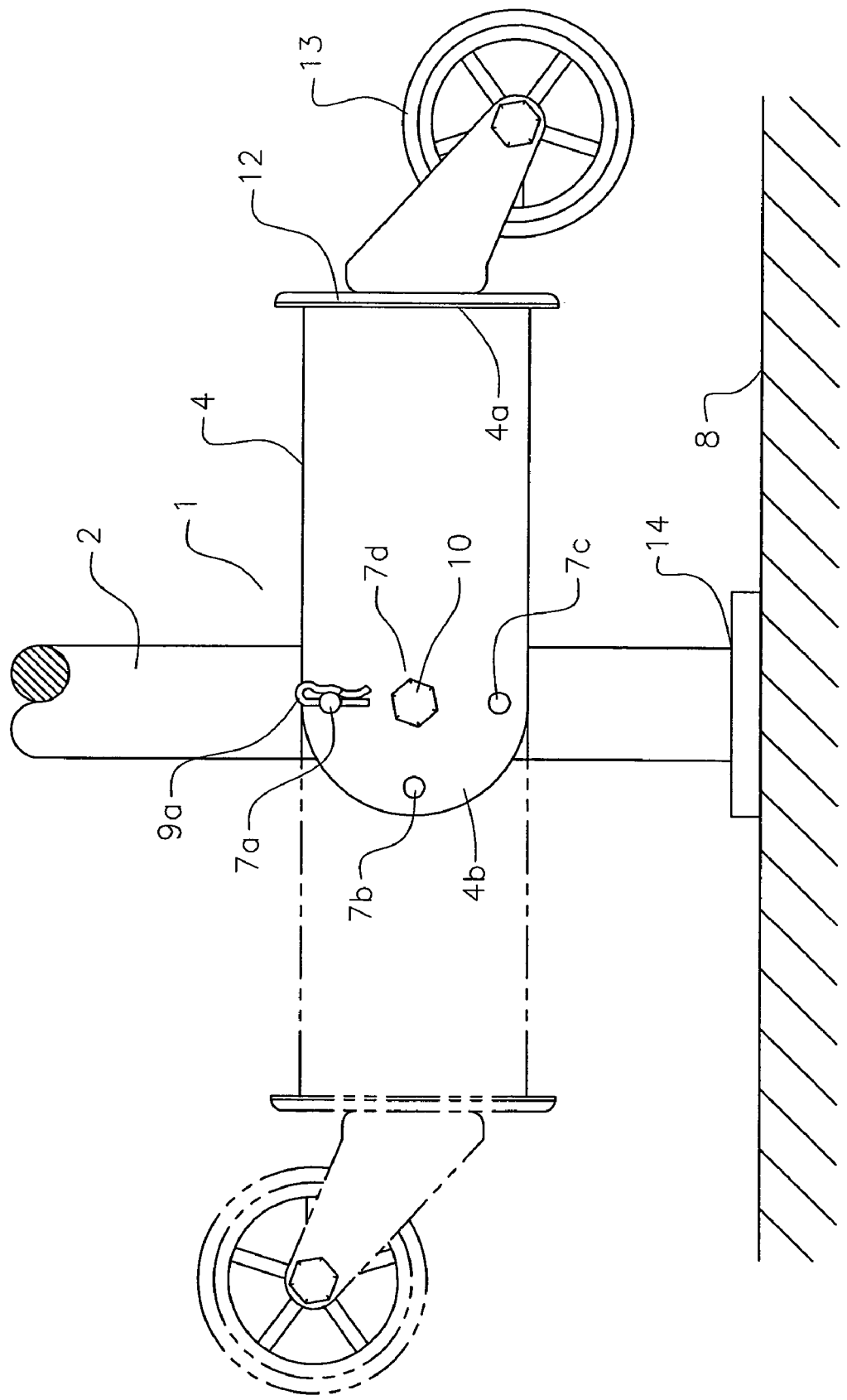

Similar to FIG. 1, FIG. 5 describes an alternate embodiment of the present invention. In combination with an existing jack 2 having a flat foot 14, the present invention has a foot 1 with a left flange 4, an opposite right flange 5, and a plate 12 joining both flanges 4, 5. The plate 12 has a generally rectangular shape with a depending caster 13 located opposite the flanges 4, 5. The longitudinal axis of the plate 12 is generally parallel to the length of the trailer. The left flange 4 is mutually parallel to and spaced apart from the right flange 5. The left flange 4 and right flange 5 attach perpendicular to the plate 12 and within the perimeter of the plate 12. The left flange 4 and the right flange 5 have a square lateral end 4a, 5a that attaches to the plate 12 and an opposite rounded end 4b, 5b proximate to the jack 2 as in FIG. 1.

The rounded end 4b, 5b has a generally semi-circular shape with a first hole 7a, a second hole 7b, and a third hole 7c proximate to the perimeter of the round end. The first hole 7a, a second hole 7b, and a third hole 7c are spaced at an irregular interval from one another. In use, the alternate embodiment of the foot 1 is rotated generally parallel with the ground 8 and a handle 9 is placed through the first holes 7a of the left flange 4, the right flange 5, and the jack 2 near the foot. A pin secures the handle 9 through the first holes 7a resulting in the plate 12 being located towards the rear of a trailer. FIG. 5 also illustrates that the plate 12 can be located towards the front of a trailer with a handle 9 placed through the third holes 7c of the left flange 4 and the right flange 5, and the first hole 7a of the jack 2. The alternate embodiment allows rotation of the foot 1 beneath the flat foot 14 of a jack akin to FIG. 2. Beneath the flat foot 14, the castor 13 allows movement of the jack 2 in the direction of an applied force. The castor 13 guides the tongue which guides the trailer in a desired direction.

A further alternate embodiment has the castor 13 with an upright pin. The pin extends from the supports that hold the axle of the castor 13. The upright pin installs within a centered longitudinal hole in the flat foot 14 of the existing jack 2. A trailer owner can add or remove the pin and castor 13 from the flat foot as needed.

From the aforementioned description, a jack with an optional pivoting foot has been described. The jack with an optional pivoting foot is uniquely capable of changing a wheeled jack to a flat footed jack and vice-versa. The jack with an optional pivoting foot and its various components may be manufactured from many materials, including but not limited to polymers, polyvinyl chloride, high density polyethylene, polypropylene, nylon, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device adapted to be secured to an existing wheeled or a flat foot jack upon a trailer tongue, comprising:
   a central hole adapted into said jack proximate to said existing foot and a first hole above said central hole;
   a pivoting foot about a bolt through said central hole and secured about said first hole, said foot pivoting from a first configuration towards a trailer, through a second configuration beneath an existing foot, and to a third configuration away from a trailer;
   said foot having a base, generally planar with an upturned perimeter; a pair of flanges, mutually parallel and spaced apart to admit a wheel, attaching perpendicular to said base, having a first end proximate to said base and an opposite second end, said second end having two or more holes upon the perimeter; said bolt, extending through said flanges and said central hole; a handle, sized to fit through the holes in said flanges, having a first end and an opposite second end with a removable locking pin; a means to stiffen said bolt through which said bolt passes, said foot having a generally U shape formed by said flanges as the upright portions of the U shape and said base as the bottom portion of the U shape.

2. The device of claim 1 wherein said base is rectangular with a longitudinal axis parallel to the diameter of the wheel.

3. The device of claim 1 further comprising:
said stiffening means having at least one spacer about the jack proximate to the wheel.

4. The device of claim 1 further comprising:
said flanges each having a generally rectangular shape with a first end connected to said base and an opposite second end having a rounded shape;
said second end having said holes located upon the perimeter of said second end;
said first hole locating proximate to a longitudinal edge of said flange thus securing said foot in a first configuration; and,
said second hole locating away from said first hole, generally centered upon the width of said flange, thus securing said foot in a second configuration.

5. The device of claim 4 further comprising:
a third hole locating proximate to a longitudinal edge of said flange, opposite said first hole, and said foot attains a third configuration, generally away from said first and said second configurations.

6. A device adapted to be secured to an existing wheeled or a flat foot jack upon a trailer tongue, comprising:
a central hole adapted into said jack proximate to said existing foot and a first hole above said central hole;
a pivoting foot about a bolt through said central hole and secured about said first hole, said foot pivoting from a first configuration towards a trailer, through a second configuration beneath an existing foot, and to a third configuration away from a trailer;
said foot having a plate, generally planar with an upturned perimeter; a pair of flanges, spaced apart and mutually parallel to pass around a flat foot upon said jack, attaching perpendicular to said plate, having a first end proximate to said base and an opposite second end, said second end having two or more holes upon the perimeter; said bolt, extending through said flanges and said central hole; a handle, sized to fit through the holes in said flanges, having a first end and an opposite second end with a removable locking pin; a means to stiffen said bolt through which said bolt passes;
a caster attaching to said plate opposite said flanges; and,
said foot having a generally U shape formed by said flanges as the upright portions of the U shape and said base as the bottom portion of the U shape.

7. The device of claim 6 wherein said caster is a swiveling caster.

* * * * *